(12) United States Patent
Tatsumoto et al.

(10) Patent No.: US 10,263,525 B2
(45) Date of Patent: Apr. 16, 2019

(54) POWER SUPPLY DEVICE AND IMAGE FORMING APPARATUS

(71) Applicant: Konica Minolta Inc., Chiyoda-ku, Tokyo (JP)

(72) Inventors: Yuhei Tatsumoto, Toyokawa (JP); Masayuki Watanabe, Fuchu (JP); Makoto Shimazoe, Toyokawa (JP); Akihiro Hayashi, Okazaki (JP)

(73) Assignee: KONICA MINOLTA, INC., Chiyodo-Ku, Tokyo (JP)

(*) Notice: Subject to any disclaimer, the term of this patent is extended or adjusted under 35 U.S.C. 154(b) by 0 days.

(21) Appl. No.: 15/903,419

(22) Filed: Feb. 23, 2018

(65) Prior Publication Data
US 2018/0287499 A1 Oct. 4, 2018

(30) Foreign Application Priority Data
Apr. 3, 2017 (JP) .................................. 2017-073829

(51) Int. Cl.
*H02M 3/158* (2006.01)
*H02M 7/155* (2006.01)
*H02M 3/335* (2006.01)
*H02M 3/156* (2006.01)
*H02M 1/00* (2006.01)

(52) U.S. Cl.
CPC ..... *H02M 3/1584* (2013.01); *H02M 3/33507* (2013.01); *H02M 7/1557* (2013.01); *H02M 2001/0035* (2013.01); *H02M 2001/0045* (2013.01); *H02M 2003/1566* (2013.01); *Y02B 70/16* (2013.01)

(58) Field of Classification Search
None
See application file for complete search history.

(56) References Cited

U.S. PATENT DOCUMENTS

2010/0149840 A1* 6/2010 Hayasaki ............ H02M 3/3381
363/21.09
2013/0236206 A1* 9/2013 Shoji ...................... G03G 15/80
399/88

(Continued)

FOREIGN PATENT DOCUMENTS

| JP | 2005-198484 | 7/2005 |
| JP | 2006-067703 | 3/2006 |
| JP | 2010-142071 | 6/2010 |

*Primary Examiner* — Jeffrey A Gblende
(74) *Attorney, Agent, or Firm* — Squire Patton Boggs (US) LLP

(57) ABSTRACT

A power supply device includes: a power supply circuit that converts an AC voltage into a DC voltage; and a control circuit that controls the power supply circuit, wherein the power supply circuit includes: a rectifying and smoothing circuit that rectifies and smoothes the AC voltage; a first voltage converting circuit that converts the voltage and outputs a first DC voltage; a second voltage converting circuit that switches the first DC voltage by a switching circuit to output a second DC voltage; a feedback circuit that detects and feeds back an output voltage of the first voltage converting circuit; and a selection circuit that switches a reference voltage of the feedback circuit, and the control circuit sets the switching circuit to be in a continuous connection state when a normal mode is shifted to a power saving mode and gradually switches the reference voltage.

7 Claims, 12 Drawing Sheets

(56) References Cited

U.S. PATENT DOCUMENTS

| | | | | |
|---|---|---|---|---|
| 2014/0198541 A1* | 7/2014 | Tomiyama | ........ | H02M 3/33592 363/21.14 |
| 2014/0218827 A1* | 8/2014 | Inukai | .................. | H02H 11/006 361/18 |
| 2014/0293358 A1* | 10/2014 | Inukai | ................ | H04N 1/00888 358/300 |
| 2014/0327718 A1* | 11/2014 | Kubo | ......................... | B41J 2/07 347/19 |
| 2017/0123368 A1* | 5/2017 | Watanabe | .............. | G03G 15/80 |

\* cited by examiner

POWER SUPPLY DEVICE AND IMAGE FORMING APPARATUS

The entire disclosure of Japanese patent Application No. 2017-073829, filed on Apr. 3, 2017, is incorporated herein by reference in its entirety.

BACKGROUND

Technological Field

The present disclosure relates to a power supply device, and more particularly, to a power supply device of an image forming apparatus.

Description of the Related Art

As a power supply device, for example, a switching type DC-DC converter that switches an input voltage and converts the input voltage to a predetermined output voltage has been widely used.

The DC-DC converter has a relatively large consumption current, but since the power converting efficiency is high, the high power converting efficiency becomes effective at a load (a heavy load) exceeding a certain level.

However, when the load is less than a certain level (a light load), the power converting efficiency decreases on the whole since the current consumption thereof is relatively large.

In consideration of this aspect, various systems for improving the power converting efficiency at a light load are proposed (JP 2010-142071 A, JP 2006-067703 A, and JP 2005-198484 A).

For example, JP 2010-142071 A discloses a configuration in which a DC voltage having a high voltage is output from a main converter output and a DC voltage having a low voltage is output from a sub-converter output when an AC voltage is applied to an input terminal.

Then, when the load is light, the voltage of the main converter output is decreased and the voltage of the sub-converter output is used. In this way, the power converting efficiency is improved.

Meanwhile, in the above-described configuration, a method of changing the main converter output according to the switching of a feedback circuit at the time of switching mode at a light load is shown, but there is a possibility that a change in voltage such as undershoot and overshoot may occur momentarily at the time of switching the mode.

When the voltage is supplied while the voltage changes, there is a possibility that a control system circuit corresponding to a load may be stopped or a component may be broken.

SUMMARY

The present disclosure has been made to solve the above-described problems, and an object thereof is to provide a power supply device capable of stably supplying a voltage with a simple and easy configuration and an image forming apparatus including the same.

To achieve the abovementioned object, according to an aspect of the present invention, a power supply device reflecting one aspect of the present invention comprises: a power supply circuit that converts an AC voltage into a DC voltage; and a control circuit that controls the power supply circuit, wherein the power supply circuit includes: a rectifying and smoothing circuit that rectifies and smoothes the AC voltage; a first voltage converting circuit that converts the voltage rectified and smoothed by the rectifying and smoothing circuit and outputs a first DC voltage; a second voltage converting circuit that switches the first DC voltage by a switching circuit to output a second DC voltage lower than the first DC voltage; a feedback circuit that detects and feeds back an output voltage of the first voltage converting circuit; and a selection circuit that switches a reference voltage of the feedback circuit to decrease the first DC voltage of the first voltage converting circuit to a third DC voltage, and the control circuit sets the switching circuit to be in a continuous connection state when a normal mode is shifted to a power saving mode and gradually switches the reference voltage of the feedback circuit when the normal mode is shifted to the power saving mode.

BRIEF DESCRIPTION OF THE DRAWINGS

The objects, advantages, aspects, and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
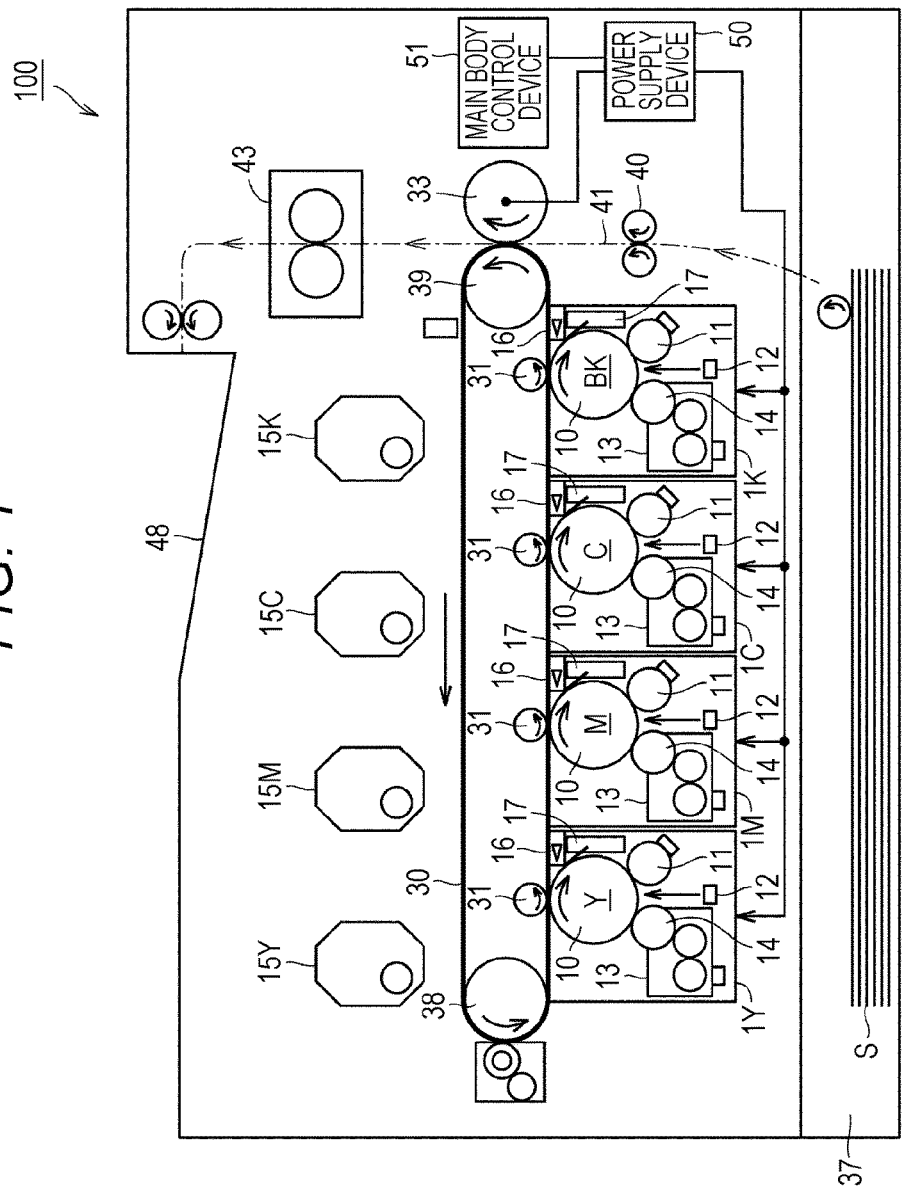
FIG. 1 is a diagram showing an example of an internal structure of an image forming apparatus according to an embodiment.

Hereinafter, one or more embodiments of the present invention will be described with reference to the drawings. However, the scope of the invention is not limited to the disclosed embodiments. In the following description, the same parts and components will be denoted by the same reference numerals. Their names and functions are also the same. Therefore, a detailed description of these will not be repeated. In addition, the embodiments and modified examples described below may be selectively and appropriately combined with each other.

In the following embodiment, a case where a power supply device is mounted in an image forming apparatus will be described. Examples of the image forming apparatus include an MFP, a printer, a copying machine, a facsimile, and the like.

[Internal Structure of Image Forming Apparatus]

FIG. 1 is a diagram showing an example of an internal structure of an image forming apparatus 100 according to the embodiment.

Referring to FIG. 1, the image forming apparatus 100 equipped with a power supply device 50 will be described.

FIG. 1 shows the image forming apparatus 100 which is a color printer. Hereinafter, the image forming apparatus 100 which is a color printer will be described, but the image forming apparatus 100 is not limited to the color printer. For example, the image forming apparatus 100 may be an MFP (Multi-Functional Peripheral).

The image forming apparatus 100 has a monochrome printing mode in which an image is formed using only black and a color printing mode in which an image is formed using yellow, magenta, cyan, and black.

The image forming apparatus 100 includes image forming units 1Y, 1M, 1C, and 1K, an intermediate transfer belt 30, a primary transfer roller 31, a secondary transfer roller 33, a cassette 37, a driven roller 38, a driving roller 39, a timing roller 40, a fixing device 43, and a power supply device 50.

The image forming units 1Y, 1M, 1C, and 1K are sequentially arranged along the intermediate transfer belt 30. The image forming unit 1Y forms a toner image of yellow (Y) by receiving a toner from a toner bottle 15Y.

The image forming unit 1M forms a toner image of magenta (M) by receiving a toner from a toner bottle 15M. The image forming unit 1C forms a toner image of cyan (C) by receiving a toner from a toner bottle 15C. The image forming unit 1K forms a toner image of black (BK) by receiving a toner from a toner bottle 15K.

The image forming units 1Y, 1M, 1C, and 1K are sequentially arranged along the intermediate transfer belt 30 in the rotation direction of the intermediate transfer belt 30. Each of the image forming units 1Y, 1M, 1C, and 1K includes a photosensitive body 10, a charging device 11, an exposure device 12, a developing device 13, a neutralization device 16, and a cleaning device 17.

The charging device 11 uniformly charges a surface of the photosensitive body 10. The exposure device 12 irradiates the photosensitive body 10 with a laser beam in response to a control signal from a main body control device 51 to be described below and exposes the surface of the photosensitive body 10 in accordance with an input image pattern. Accordingly, an electrostatic latent image is formed on the photosensitive body 10 in response to the input image.

The developing device 13 applies a developing bias to a developing roller 14 while rotating the developing roller 14 so that a toner adheres to a surface of the developing roller 14. Accordingly, the toner is transferred from the developing roller 14 to the photosensitive body 10 and a toner image according to the electrostatic latent image is developed on the surface of the photosensitive body 10.

The photosensitive body 10 and the intermediate transfer belt 30 contact each other at a portion provided with the primary transfer roller 31. The primary transfer roller 31 is adapted to be rotatable. When a transfer voltage having a polarity opposite to that of the toner image is applied to the primary transfer roller 31, the toner image is transferred from the photosensitive body 10 to the intermediate transfer belt 30.

In the case of the color printing mode, the toner image of yellow (Y), the toner image of magenta (M), the toner image of cyan (C), and the toner image of black (BK) are stacked in this order and are transferred from the photosensitive body 10 to the intermediate transfer belt 30. Accordingly, the color toner image is formed on the intermediate transfer belt 30. Meanwhile, in the case of the monochrome printing mode, the toner image of black (BK) is transferred from the photosensitive body 10 to the intermediate transfer belt 30.

The intermediate transfer belt 30 is stretched around the driven roller 38 and the driving roller 39. The driving roller 39 is rotationally driven by, for example, a motor (not shown). The intermediate transfer belt 30 and the driven roller 38 rotate in synchronization with the driving roller 39. Accordingly, the toner image on the intermediate transfer belt 30 is conveyed to the secondary transfer roller 33.

The neutralization device 16 neutralizes the charged toner adhering to the surface of the photosensitive body 10. When the charge of the charged toner is neutralized, the toner is easily collected at the cleaning device 17 to be described later.

The cleaning device 17 is pressed against the photosensitive body 10. The cleaning device 17 collects the toner remaining on the surface of the photosensitive body 10 after the toner image has been transferred.

Sheets S are set on the cassette 37. The sheets S are sent one by one from the cassette 37 to the secondary transfer roller 33 along a conveying path 41 by the timing roller 40. The secondary transfer roller 33 applies a transfer voltage having a polarity opposite to that of the toner image to the sheet S which is being conveyed. Accordingly, the toner image is attracted from the intermediate transfer belt 30 to the secondary transfer roller 33 and the toner image on the intermediate transfer belt 30 is transferred to the sheet S. A timing at which the sheet S is conveyed to the secondary transfer roller 33 is adjusted by the timing roller 40 in accordance with the position of the toner image on the intermediate transfer belt 30. By the timing roller 40, the toner image on the intermediate transfer belt 30 is transferred to an appropriate position of the sheet S.

The fixing device 43 presses and heats the sheet S passing therethrough. Accordingly, the toner image formed on the sheet S is fixed to the sheet S. Subsequently, the sheet S is discharged to a tray 48.

The power supply device 50 supplies various necessary voltages to, for example, devices inside the image forming apparatus 100. The power supply device 50 will be described later in detail. In this example, the power supply device 50 supplies a voltage of 24 V as an example to a device of a drive system inside the image forming apparatus 100. Further, the power supply device 50 supplies a voltage of 5 V as an example to a device of a control system inside the image forming apparatus 100.

[Hardware Configuration of Image Forming Apparatus]

Figure 2:
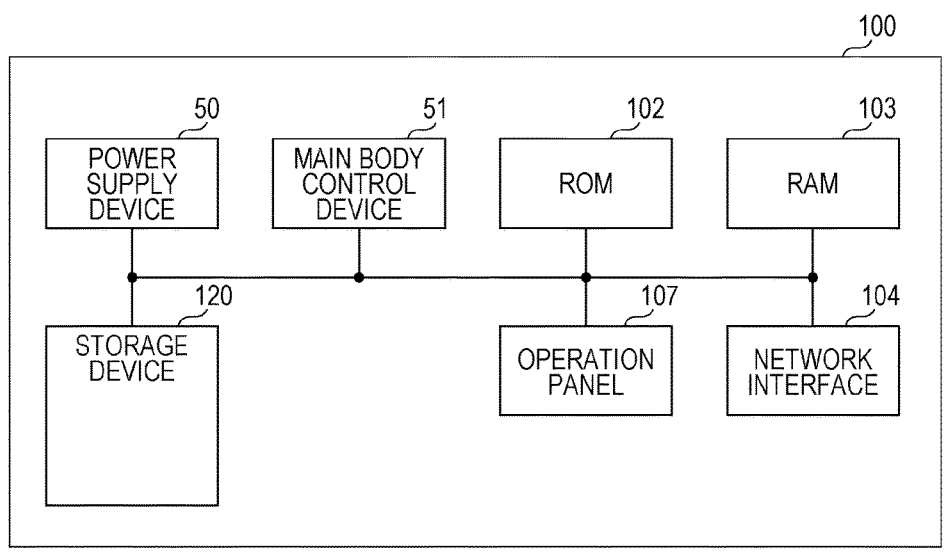
FIG. 2 is a block diagram showing a main hardware configuration of the image forming apparatus.

FIG. 2 is a block diagram showing a configuration of a main hardware of the image forming apparatus 100. Referring to FIG. 2, an example of the hardware configuration of the image forming apparatus 100 will be described.

As shown in FIG. 2, the image forming apparatus 100 includes the power supply device 50, the main body control device 51, a ROM (Read Only Memory) 102, a RAM (Random Access Memory) 103, a network interface 104, an operation panel 107, and a storage device 120.

The main body control device 51 is configured as, for example, at least one integrated circuit. The integrated circuit includes, for example, at least one CPU, at last one DSP, at least one ASIC (Application Specific Integrated Circuit), at least one FPGA (Field Programmable Gate Array), or a combination thereof.

The main body control device 51 controls both the power supply device 50 and the image forming apparatus 100. That is, the main body control device 51 is commonly used in the power supply device 50 and the image forming apparatus 100. Additionally, the main body control device 51 may be separated from the power supply device 50 or may be integrated with the power supply device 50. When the main body control device 51 is separated from the power supply device 50, the configuration of the power supply device 50 becomes simple.

The main body control device 51 selects any one of the monochrome printing mode and the color printing mode in accordance with the information input to the operation panel 107 and controls the power supply device 50 and the image forming apparatus 100 in accordance with the selected mode. The main body control device 51 outputs a selection mode identification signal representing a selected mode to the power supply device 50.

The main body control device 51 controls the operation of the image forming apparatus 100 by executing a control program of the power supply device 50 or the image forming apparatus 100.

The main body control device 51 reads the control program from the storage device 120 to the ROM 102 based on the received control program execution command. The RAM 103 serves as a working memory and temporarily stores various data necessary for executing the control program.

The main body control device 51 executes a predetermined process on the power supply device 50 based on the control program execution command. As an example, the main body control device 51 executes a control of switching the normal mode to the power saving mode in accordance with the command of switching to the power saving mode through the operation panel 107 from a user.

The main body control device 51 instructs the power supply device 50 to be shifted from the normal mode to the power saving mode. Specifically, the main body control device 51 outputs a switching signal to the power supply device 50. Further, in this example, a method of switching the normal mode to the power saving mode in accordance with the command of the switching to the power saving mode through the operation panel 107 from the user has been described, but the invention is not limited thereto. For example, a control of automatically switching the normal mode to the power saving mode when a period in which the user does not perform any operation is continued for a predetermined period may be executed.

An antenna (not shown), for example, is connected to the network interface 104. The image forming apparatus 100 exchanges data with an external communication device through the antenna. Examples of the external communication device include, for example, a portable communication terminal such as a smart phone, a server, and the like. The image forming apparatus 100 may be configured to download the control program from the server through the antenna.

The operation panel 107 includes a display and a touch panel. The display and the touch panel overlap each other and the operation panel 107 receives, for example, a printing operation or a scanning operation for the image forming apparatus 100.

The storage device 120 is, for example, a storage medium such as a hard disk or an external storage device. The storage device 120 stores the control program or the like of the image forming apparatus 100. The control program storage location is not limited to the storage device 120 and the control program may be stored in a storage area of the power supply device 50, a storage area (for example, a cache or the like) of the main body control device 51, the ROM 102, the RAM 103, an external device (for example, a server), or the like. The control program may be provided as a part of an arbitrary program instead of a single program. In this case, a control process according to the embodiment is realized in cooperation with the arbitrary program. A program which does not include some of such modules does not depart from the spirit of the control program according to the embodiment. Further, a part or all of the functions provided by the control program may be realized by dedicated hardware. In addition, the image forming apparatus 100 may be configured in the form of a so-called cloud service in which at least one server executes a part of the process of the control program.

[Power Supply Device]

Figure 3:
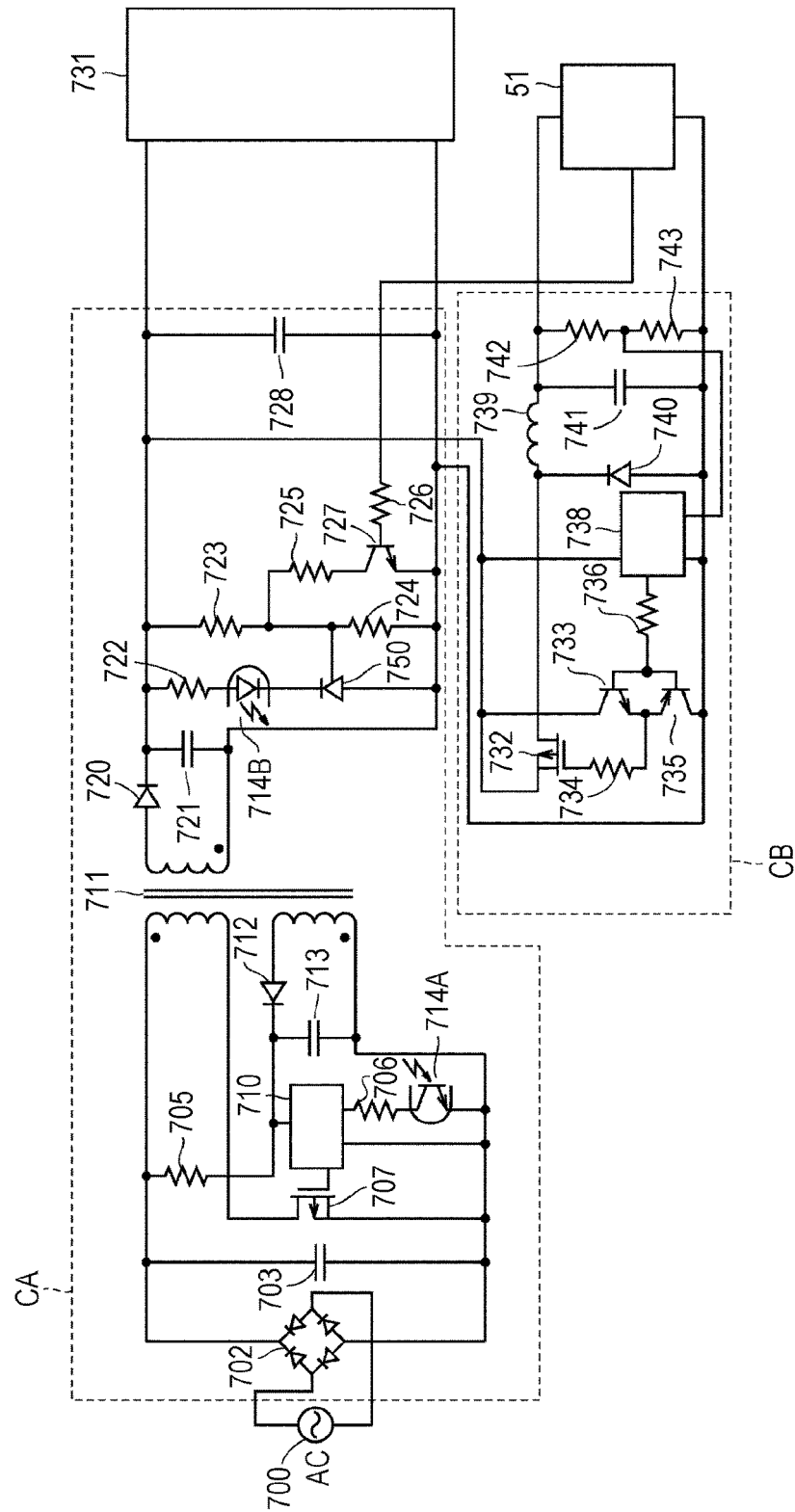
FIG. 3 is a diagram illustrating a configuration of a power supply device described as Comparative Example 1.

FIG. 3 is a diagram illustrating a configuration of a power supply device described as Comparative Example 1.

Referring to FIG. 3, the power supply device includes two modes of the normal mode and the power saving mode in accordance with the state of the mounting target device and can switch the two modes.

The main body control device 51 controls the device state and controls the operation mode of the power supply device, that is, the operation in each of modes of the normal mode and the power saving mode.

The main body control device 51 controls the device state and controls the operation mode of the power supply device, that is, the operations in the modes of the normal mode and the power saving mode. Specifically, the main body control device 51 outputs a switching signal when shifting the mode to the power saving mode.

In this example, a first DC-DC converter circuit CA which supplies a power supply voltage to the drive system and a second DC-DC converter circuit CB which supplies a power supply voltage to the control system are provided.

The first DC-DC converter circuit CA is connected to a commercial AC power supply 700 and outputs a DC voltage.

The first DC-DC converter circuit CA at the primary side includes a rectifier 702 which is connected to the commercial AC power supply 700, a smoothing capacitor 703, resistances 705 and 706, a switching element (FET) 707, a power control IC 710, a transformer 711, a diode 712, a capacitor 713, and a light receiving side 714A of a photocoupler 714.

Further, the first DC-DC converter circuit CA at the secondary side includes a secondary rectifier diode 720, a secondary smoothing capacitor 721, resistances 722 to 726, a shunt regulator 750, a light emitting side 714B of the photocoupler 714, a transistor 727, and a capacitor 728.

The second DC-DC converter circuit CB includes driving transistors 733 and 735 which are switching means connected to the output of the first DC-DC converter circuit CA and generating a second DC voltage from the output (a first DC voltage) of the first DC-DC converter circuit CA, a gate resistance 734, a control IC 738, an inductor 739, a diode 740, a capacitor 741, and resistances 742 and 743.

The first DC-DC converter circuit CA is connected to a load (a drive system) 731 of the first DC voltage.

The second DC-DC converter circuit CB is connected to the main body control device 51 (CPU (control system)) corresponding to a load of the second DC voltage.

The operation of the first DC-DC converter circuit CA will be described.

When an AC voltage (AC voltage) is applied from the commercial AC power supply 700, the smoothing capacitor 703 is charged by a voltage rectified by the rectifier 702. The rectifier 702 and the smoothing capacitor 703 serve as a rectifying and smoothing circuit which rectifies and smoothes an AC voltage from an AC power supply.

When the voltage of the smoothing capacitor 703 rises, power is supplied to the power control IC 710 through the resistance 705. The power control IC 710 turns on the FET 707. When the FET 707 is turned on, a current flows to a primary coil Np of the transformer 711. By a voltage applied to the coil Np of the transformer 711, a voltage also appears in coils Ns and Nb.

The voltage appearing in the coil Nb is blocked so that no current flows by the diode 712 and the voltage of the coil Ns is also blocked so that no current flows by the secondary rectifier diode 720.

The FET 707 is turned off after a predetermined time determined by the internal circuit of the power control IC 710 elapses.

Accordingly, a voltage at the drain side of the FET 707 of the coil Np rises. Further, a current flows in the coil Ns through the secondary rectifier diode 720 in a direction in which the secondary smoothing capacitor 721 is charged so that the secondary smoothing capacitor 721 is charged and a voltage of the secondary smoothing capacitor 721 rises.

A predetermined time determined by the internal circuit of the power control IC 710 elapses, the FET 707 is turned on so that a current is supplied from the smoothing capacitor 703 to the transformer 711 again.

When the FET 707 is turned off by the power control IC 710 after a predetermined time elapses, the secondary smoothing capacitor 721 is charged again by the voltage of the coil Ns through the secondary rectifier diode 720.

The voltage of the secondary smoothing capacitor 721 is divided by resistances 723 and 724 and the voltage of the resistance 724 is applied to a control terminal of the shunt regulator 750. A cathode current of the shunt regulator 750 is transmitted to the power control IC 710 through the photocoupler 714.

The resistances 723 to 726 and the transistor 727 constitute a feedback circuit.

The shunt regulator 750 compares the voltage of the resistance 724 output from the feedback circuit and divided by the resistances 723 and 724 with an internal reference voltage. When the voltage of the resistance 724 is higher than the reference voltage, the shunt regulator 750 is operated to decrease the output voltage by decreasing the on-width or the on-duty of the FET 707. When the voltage of the resistance 724 is lower than the reference voltage of the shunt regulator 750, the shunt regulator is operated to perform a feedback operation in which the output voltage rises by increasing the on-time or the on-duty of the FET 707.

Next, the operation of the second DC-DC converter circuit CB will be described.

The second DC-DC converter circuit CB generates the second DC voltage from the output voltage of the first DC-DC converter circuit CA.

In the normal mode, the control IC 738 of the second DC-DC converter circuit CB intermittently drives the FET 732 through the driving transistors 733 and 735 and the gate resistance 734.

The resistances 742 and 743 divide the output voltage of the second DC-DC converter circuit CB. The voltage of the resistance 743 dividing the output voltage is input to the control IC 738.

The control IC 738 has an internal reference voltage Vref2 and stably generates a second DC voltage by controlling the on-duty of the FET 732 so that the voltage Vref2 becomes the same as the voltage of the resistance 743.

In this configuration, a load switch (not shown) may be provided at the output side for outputting the power supply voltage of the drive system in order to decrease the power in the power saving mode and the load switch may be turned off.

(1) Normal Mode

The main body control device 51 turns on the transistor 727 in the normal mode. Accordingly, the resistance 724 and the resistance 725 are connected in parallel between the control terminal and the anode of the shunt regulator 750. The shunt regulator 750 allows a current to flow between the cathode and the anode so that the voltage between the control terminal and the anode becomes a predetermined reference voltage value. For this reason, the FET 707 is controlled so that the output voltage Vout (the first output voltage) of the first DC-DC converter becomes a voltage in which a result divided by the resistance 723 and the resistance between the control terminal and the anode becomes a reference voltage value Vref. The output voltage Vout is expressed by the following equation.

$$V\text{out} = [(\text{Resistance } 723 + R)/R] \times V\text{ref}$$

Here, R denotes a resistance value obtained by the parallel connection of the resistance 724 and the resistance 725 and is expressed by the following equation.

$$R = \text{Resistance } 724 \times \text{Resistance } 725/(\text{Resistance } 724 + \text{Resistance } 725)$$

(2) Power Saving Mode

The main body control device 51 turns off a transistor 127 in the power saving mode which is an energy saving state. When the transistor 127 is turned off, the resistance between the control terminal and the anode of the shunt regulator 750 is only the resistance 724. Since the shunt regulator 750 is operated so that the voltage between the control terminal and the anode becomes a predetermined reference voltage value, the output voltage Vout3 (the third DC voltage) is expressed by the following equation.

$$V\text{out3} = [(\text{the resistance } 723 + \text{the resistance } 724)/\text{the resistance } 724] \times V\text{ref}$$

Since the resistance between the control terminal and the anode of the shunt regulator is higher than that of the normal mode, the output voltage falls.

When the output voltage of the first DC-DC converter circuit CA falls in the power saving mode, the FET 732 is turned on for a long time (to have a large on-duty) so that the output voltage is kept constant.

Specifically, when the output voltage of the first DC-DC converter circuit CA becomes the third DC voltage or less, the FET 232 of the second DC-DC converter circuit CB is fixed to an on state (on-duty of 100%). The FET 232 of the second DC-DC converter circuit CB is in a continuous connection state.

The output voltage (the third DC voltage) of the first DC-DC converter circuit CA is supplied to the main body control device 51 through the FET 232 of the second DC-DC converter circuit CB.

(3) Description of Shifting Operation to Power Saving Mode

Next, the shift from the normal mode to the power saving mode will be described.

In this example, a case where the first DC-DC converter circuit CA outputs 24 V in the normal mode and outputs 5 V in the power saving mode will be described as an example.

Figure 4:
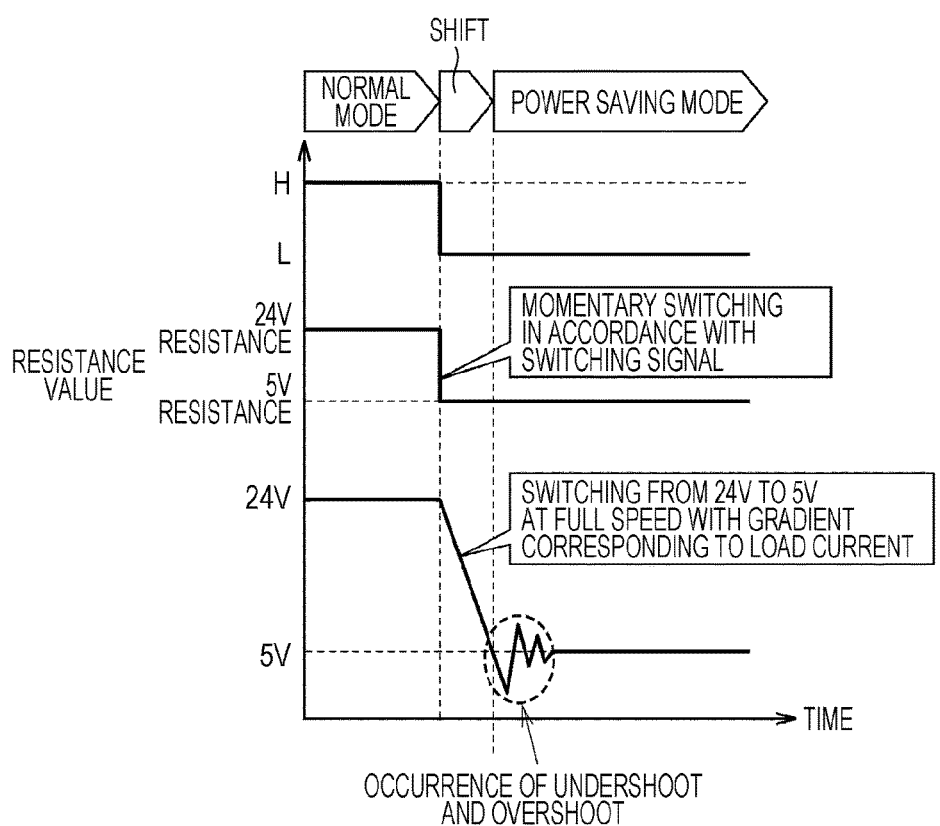
FIG. 4 is a diagram illustrating a shift from a normal mode to a power saving mode of a power supply device of Comparative Example 1.

FIG. 4 is a diagram illustrating a shift from the normal mode to the power saving mode of the power supply device of Comparative Example 1.

As shown in FIG. 4, when the normal mode is shifted to the power saving mode, the main body control device 51 changes the switching signal controlling the transistor 727 from an "H" level to an "L" level. Accordingly, the transistor 727 is turned off.

Thus, the divided resistance values of the resistances 723 to 725 are switched from the resistance value for generating 24 V to the resistance value for generating 5 V.

Accordingly, when 5 V is output in the power saving mode, the output voltage is switched from 24 V to 5 V at a full speed with a gradient corresponding to the load current.

Thus, there is a possibility that a change in voltage such as undershoot and overshoot may occur momentarily as shown in FIG. 4.

[Power Supply Device 50]

Figure 5:
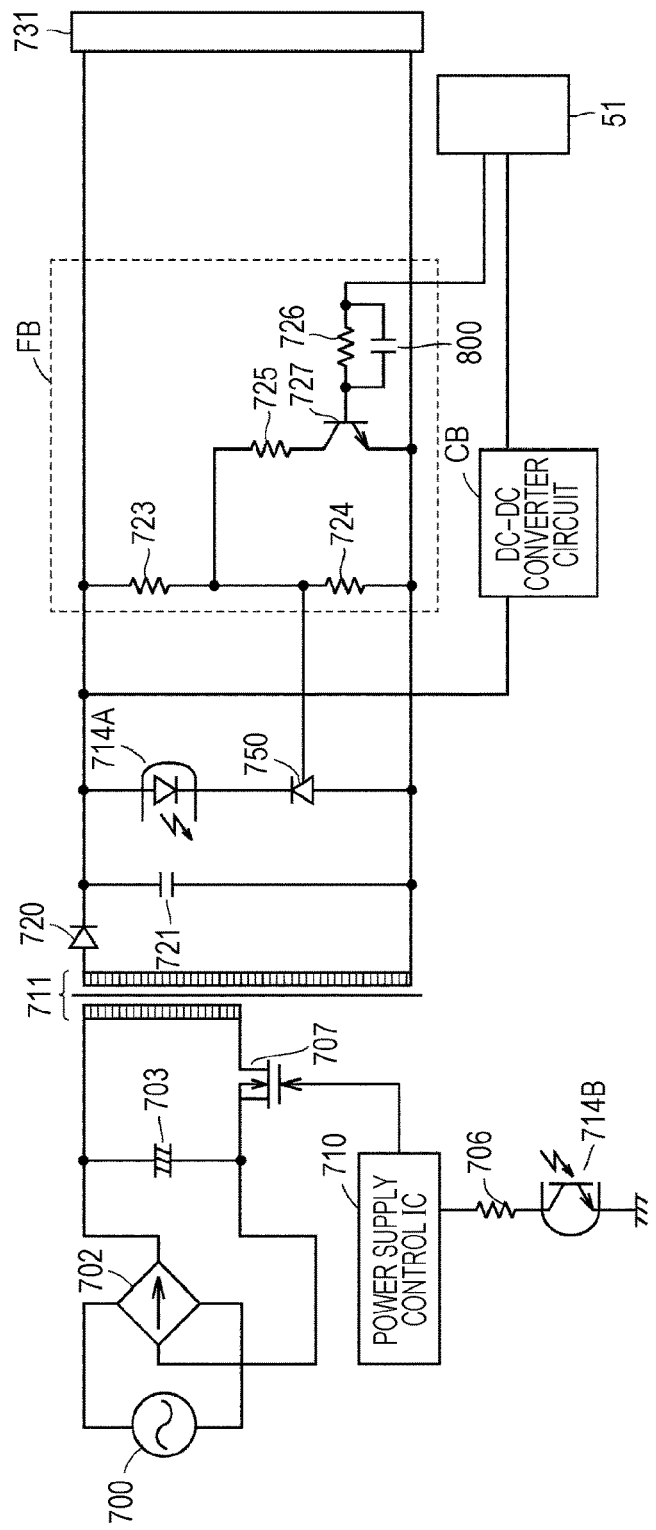
FIG. 5 is a diagram illustrating a configuration of a power supply device according to an embodiment of the present disclosure.

FIG. 5 is a diagram illustrating the configuration of the power supply device 50 of the embodiment of the present disclosure.

Referring to FIG. 5, in this example, only a main part of the circuit configuration of the power supply device of FIG. 3 is shown.

The power supply device 50 is different from the power supply device of Comparative Example 1 of FIG. 3 in that the configuration of the feedback circuit FB is modified. Since the other configurations are the same as those of the power supply device which is Comparative Example 1 of FIG. 3, a detailed description thereof will not be repeated.

The feedback circuit FB includes the resistances 723 to 726, the transistor 727, and a capacitor 800.

The capacitor 800 is connected in parallel to the resistance 726.

A current path for generating a voltage to be input to the shunt regulator 750 is switched in accordance with the switching signal.

With this configuration, the switching signal input to the transistor 727 and output from the main body control device 51 gradually changes in accordance with a time constant based on the capacitance of the capacitor 800 and the resistance value of the resistance 726 when the capacitor 800 is connected in parallel to the resistance 726.

That is, since the switching of the transistor 727 is gradually performed, the switching of the divided resistance value of the feedback circuit FB is gradually performed.

Figure 6:
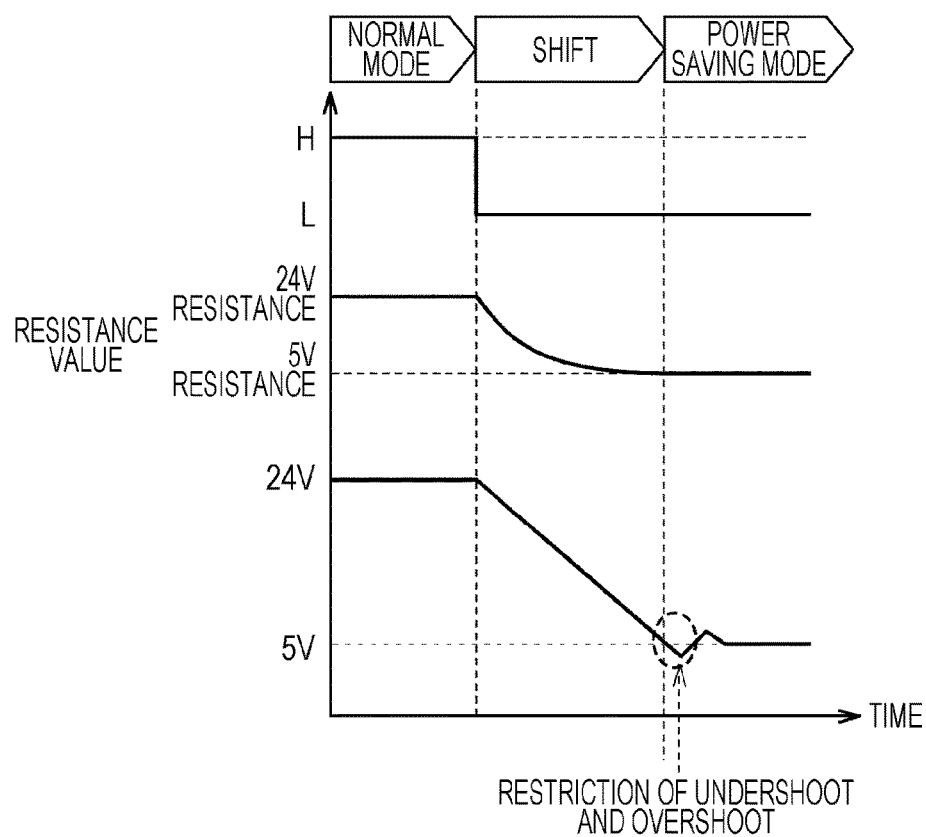
FIG. 6 is a diagram illustrating a shift from a normal mode to a power saving mode of the power supply device according to the embodiment of the present disclosure.

FIG. 6 is a diagram illustrating a shift from the normal mode to the power saving mode of the power supply device 50 according to the embodiment of the present disclosure.

As shown in FIG. 6, when the normal mode is shifted to the power saving mode, the main body control device 51 changes the switching signal controlling the transistor 727 from an "H" level to an "L" level. Accordingly, the transistor 727 is turned off.

At that time, the transistor 727 is gradually turned off as described above.

Thus, the divided resistance values of the resistances 723 to 725 are gradually switched from a resistance value for generating 24 V to a resistance value for generating 5 V.

Accordingly, the voltage gradually falls to 5 V in accordance with the switching of the resistance value at the time of outputting 5 V in the power saving mode.

Thus, as shown in FIG. 6, it is possible to suppress a change in voltage such as undershoot and overshoot and to supply a stable voltage with a simple and easy configuration.

[Power Supply Device]

Figure 7:
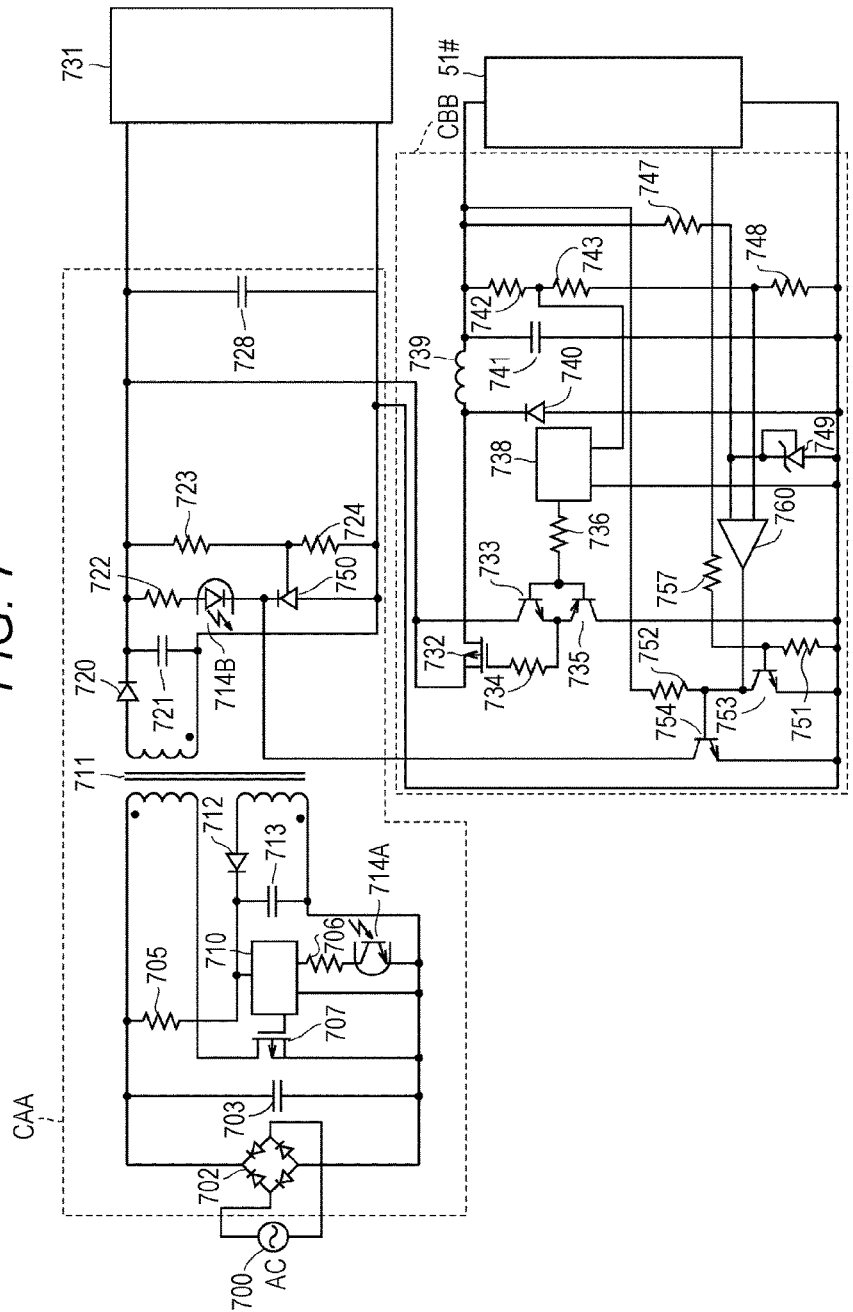
FIG. 7 is a diagram illustrating a configuration of a power supply device described as Comparative Example 2.

FIG. 7 is a diagram illustrating a configuration of a power supply device described as Comparative Example 2.

Referring to FIG. 7, it is assumed that the power supply device is particularly of an RCC type or a frequency control type in which a switching frequency rises in the power saving mode (at a light load) and a control IC is used. In addition, the RCC (Ringing Choke Converter) type is a kind of flyback type converter and is a converter that performs a switching operation by self-excited oscillation.

In this configuration, a feedback point is switched in the power saving mode. Specifically, in the power saving mode, the feedback point is switched from a point immediately after the output of the first DC-DC converter circuit to the output side of the second DC-DC converter circuit.

When a load current in the power saving mode increases, there is a possibility that a voltage may drop due to a resistance component of the coil or the FET in the DC-DC converter circuit, but when the feedback point is switched to the output side of the second DC-DC converter circuit, it is possible to perform a stabilization control including the dropped voltage. That is, it is possible to improve the followability to a change in output load.

In this example, a first DC-DC converter circuit CAA which supplies a power supply voltage to a drive system and a second DC-DC converter circuit CBB which supplies a power supply voltage to a control system are provided.

Further, the second DC-DC converter circuit CBB is used to supply a voltage to a main body control device 51#. The main body control device 51# outputs a switching signal when the mode is shifted to the power saving mode.

The first DC-DC converter circuit CAA is connected to the commercial AC power supply 700 and outputs a DC voltage.

Since a primary side configuration of the first DC-DC converter circuit CAA is the same as that of the first DC-DC converter circuit CA described in FIG. 3, a detailed description thereof will not be repeated.

A secondary side configuration of the first DC-DC converter circuit CAA has a different configuration involving with the switching of the divided resistance in the power saving mode. Specifically, the resistances 725 and 726 and the transistor 727 are eliminated. Since the other configurations are the same as those of the first DC-DC converter circuit CA described in FIG. 3, a detailed description thereof will not be repeated.

The second DC-DC converter circuit CBB further includes resistances 751, 752, 757, 758, and 759, a comparator 760, a shunt regulator 749, and transistors 753 and 754 compared to the second DC-DC converter circuit CB.

In the normal mode, the main body control device 51# turns on the transistor 753.

When the transistor 753 is turned on, the transistor 754 is turned off.

Thus, the first DC-DC converter circuit CAA outputs a first DC voltage by the operation of the shunt regulator 750 regardless of the operation of the comparator 760.

Further, the second DC-DC converter circuit CBB outputs a second DC voltage by intermittently driving the FET 732 using the control IC 738.

In the power saving mode, the main body control device 51# turns off the transistor 753.

When the transistor 753 is turned off, the transistor 754 is operated by the output of the comparator 760.

Specifically, when the transistor 754 is turned on, the photocoupler 714 is operated. Accordingly, the power control IC 710 turns on the FET 707.

In the power saving mode, the power control IC 710 performs control so that an output of the first DC-DC converter circuit CAA becomes a third DC voltage in accordance with the output of the comparator 760.

When the output voltage of the first DC-DC converter circuit CAA falls in the power saving mode, the on-time (on-duty) of the FET 732 is increased so that the output voltage is kept constant.

Specifically, when the output voltage of the first DC-DC converter circuit CAA becomes the third DC voltage or less, the FET 232 of the second DC-DC converter circuit CBB is fixed to an on state (on-duty of 100%). The FET 232 of the second DC-DC converter circuit CBB is in a continuous connection state.

The output voltage (the third DC voltage) of the first DC-DC converter circuit CAA is supplied to the main body control device 51# through the FET 232 of the second DC-DC converter circuit CBB.

Meanwhile, even in the shift from the normal mode to the power saving mode of the power supply device of Comparative Example 2, the main body control device 51# changes the switching signal controlling the transistor 753 from an "H" level to an "L" level similarly to the power supply device of Comparative Example 1 when the normal mode is shifted to the power saving mode. Accordingly, the transistor 753 is turned off.

Thus, the power control IC 710 performs control so that the output of the first DC-DC converter circuit CAA becomes the third DC voltage in accordance with the output of the comparator 760, but since the voltage is switched from 24 V to 5 V at a full speed with a gradient corresponding to the load current as described above, there is a possibility that a change in voltage such as undershoot and overshoot may occur momentarily.

[Power Supply Device 50#]

Figure 8:
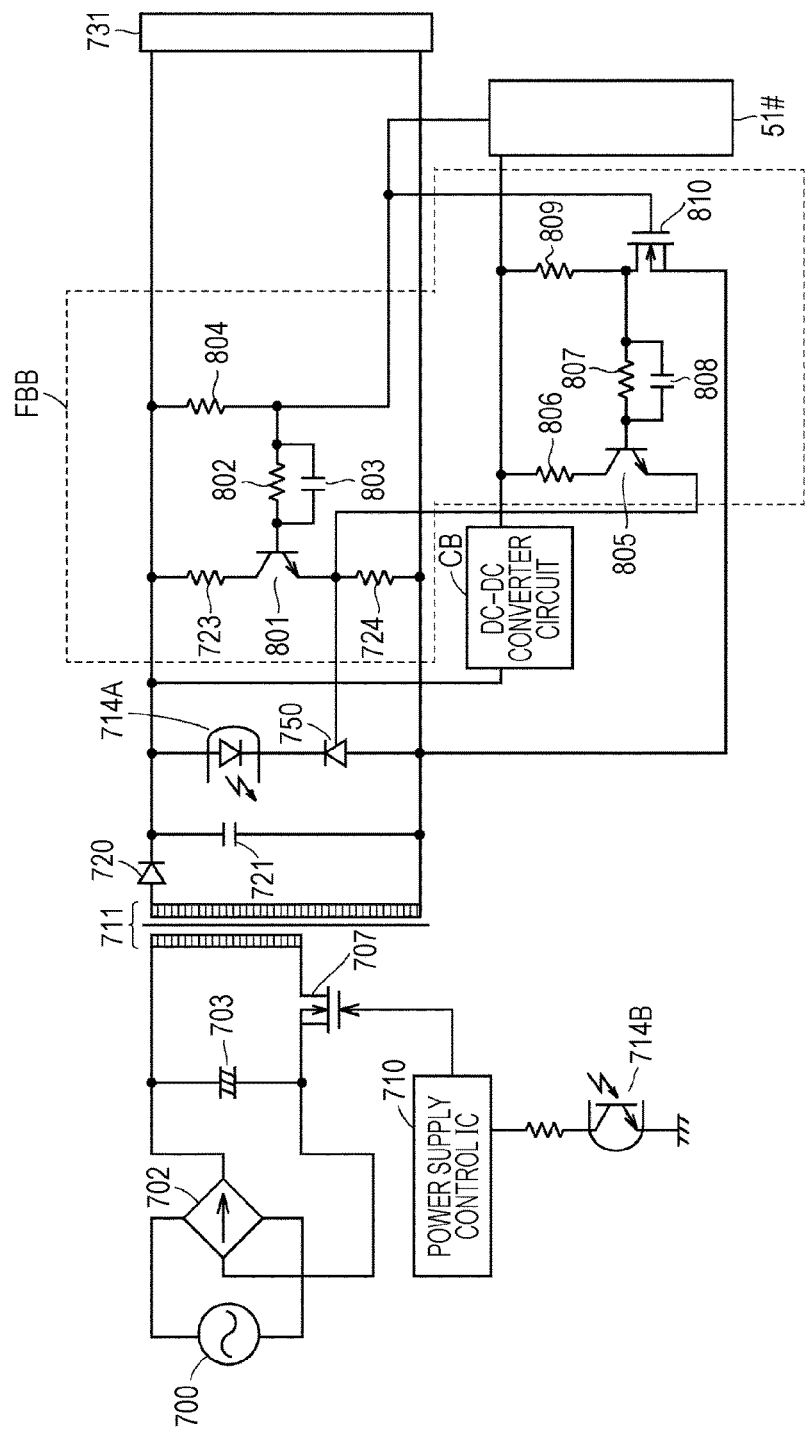
FIG. 8 is a diagram illustrating a configuration of a power supply device according to the embodiment of the present disclosure.

FIG. 8 is a diagram illustrating the configuration of the power supply device 50# according to the embodiment of the present disclosure.

Referring to FIG. 8, in this example, a main part of a circuit configuration of the power supply device of FIG. 7 is shown.

The power supply device 50# is different from the power supply device of Comparative Example 2 of FIG. 7 in that the configuration of the feedback circuit FBB is changed. Since the other configurations are the same as those of the power supply device which is Comparative Example 2 of FIG. 7, a detailed description thereof will not be repeated.

The feedback circuit FBB includes resistances 723, 724, 802, 804, 806, 807, and 809, transistors 801, 805, and 810, and capacitors 803 and 808.

The transistor 801 is connected between the resistances 723 and 724.

The gate of the transistor 801 is connected to the resistance 802. The capacitor 803 is connected in parallel to the resistance 802. One end side of the resistance 804 is connected to the resistance 802 and the other end side thereof is connected to the output side of the first DC-DC converter circuit CAA. Further, a switching signal is transmitted from the main body control device 51# to the connection node between the resistances 802 and 804.

One end side of the transistor 805 is connected to the resistance 806. The other end side of the transistor 805 is connected to a connection node between the transistor 801 and the resistance 724. The resistance 806 is connected to the output side of the second DC-DC converter circuit CBB. The gate of the transistor 805 is connected to the resistance 807. The resistance 807 is connected in parallel to the capacitor 808. One end side of the resistance 809 is connected to the resistance 807 and the other end side thereof is connected to the output side of the second DC-DC converter circuit CBB. The transistor 810 is connected between a ground voltage and the connection node between the resistance 809 and the resistance 807. The gate of the transistor 810 receives a switching signal.

In the normal mode, the switching signal is set to an "H" level. Accordingly, the transistor 810 is turned on. Thus, the transistor 805 is turned off.

Meanwhile, since the switching signal is set to an "H" level, the transistor 801 is turned on. Thus, a voltage based on the divided resistances of the resistances 723 and 724 is input to the control terminal of the shunt regulator 750.

In the power saving mode, the switching signal is set to an "L" level. Accordingly, the transistor 801 is turned off. Further, since the transistor 810 is turned off, the transistor 805 is turned on. Thus, a voltage based on the divided resistances of the resistances 805 and 724 is input to the control terminal of the shunt regulator 750.

Figure 9:
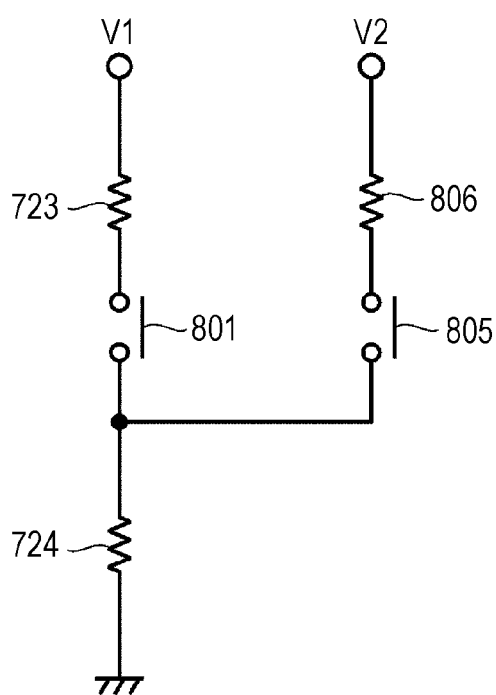
FIG. 9 is a diagram schematically illustrating the switching of a resistance of a feedback circuit of the present disclosure.

FIG. 9 is a diagram schematically illustrating the switching of the resistance of the feedback circuit FBB of the present disclosure.

As shown in FIG. 9, since the transistor 801 is turned on in the normal mode, a voltage based on the divided resistances of the resistances 723 and 724 is input to the control terminal of the shunt regulator 750. Meanwhile, in the power saving mode, the transistor 805 is turned on. Thus, a voltage based on the divided resistances of the resistances 806 and 724 is input to the control terminal of the shunt regulator 750.

A current path generating a voltage input to the shunt regulator 750 is switched in accordance with the switching signal.

Figure 10A:
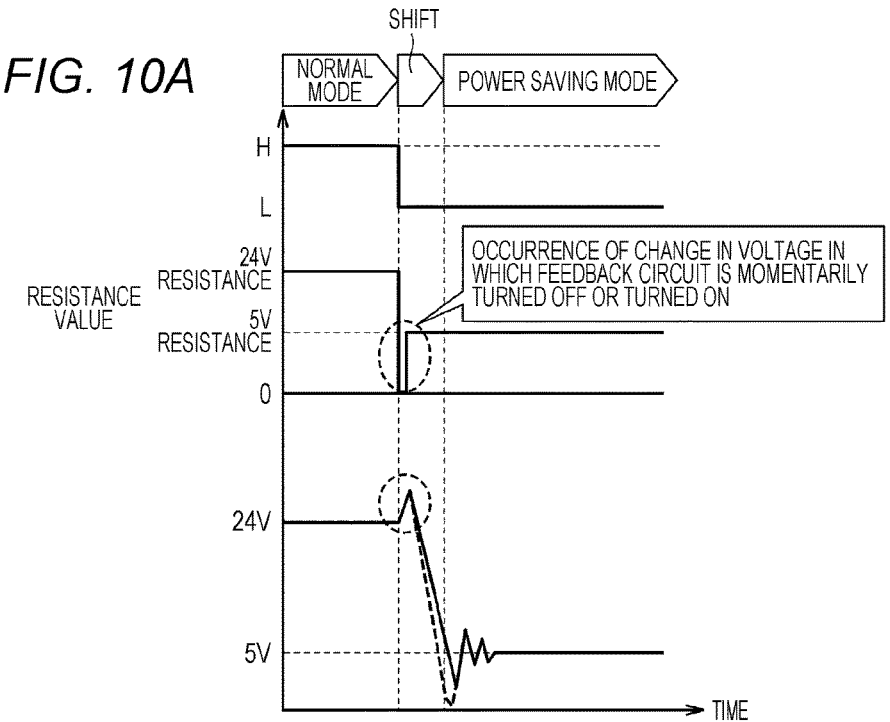
FIGS. 10A and 10B are diagrams illustrating a shift from a normal mode to a power saving mode of a power supply device.
Figure 10B:
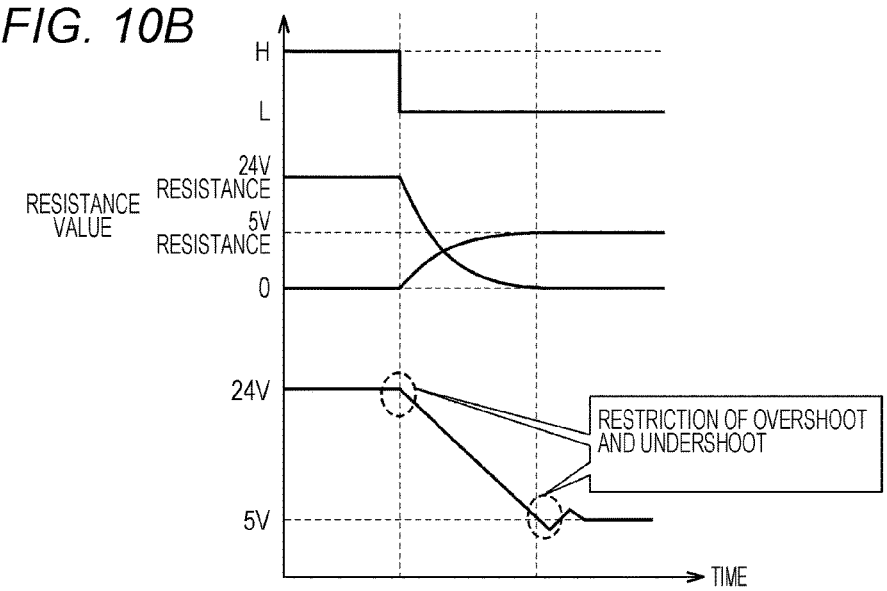

FIGS. 10A and 10B are diagrams illustrating a shift from the normal mode to the power saving mode in the power supply device.

FIG. 10A shows a shift in a case where the feedback circuit FBB is not provided with the capacitors 803 and 808 of Comparative Example.

When the normal mode is shifted to the power saving mode, the main body control device 51# changes the switching signal from an "H" level to an "L" level.

Accordingly, the transistor 801 is turned off. Further, the transistor 810 is turned off and the transistor 805 is turned on.

At that time, the feedback circuit FBB is momentarily turned on or off in accordance with the switching signal.

Accordingly, a resistance changes largely from a resistance value for generating 24 V to a resistance value for generating 5 V.

With this change in voltage, there is a possibility that a voltage higher than 24 V may be output momentarily.

Further, there is a possibility that a change in voltage such as undershoot and overshoot may occur in the vicinity of 5 V.

FIG. 10B shows a shift in a case where the capacitors 803 and 808 are provided in the feedback circuit FBB.

When the normal mode is shifted to the power saving mode, the main body control device 51# changes the switching signal from an "H" level to an "L" level.

Accordingly, the transistor 801 is turned off. At that time, the transistor 801 is gradually turned off as described above. Further, the transistor 810 is turned off and the transistor 805 is gradually turned on.

Thus, the resistance value for generating 24 V gradually decreases and the resistance value for generating 5 V gradually increases. That is, the voltage is gradually changed from the resistance value for generating 24 V to the resistance value for generating 5 V.

Accordingly, it is possible to suppress a change in voltage such as undershoot and overshoot and to supply a stable voltage with a simple and easy configuration.

MODIFIED EXAMPLE

Figure 11:
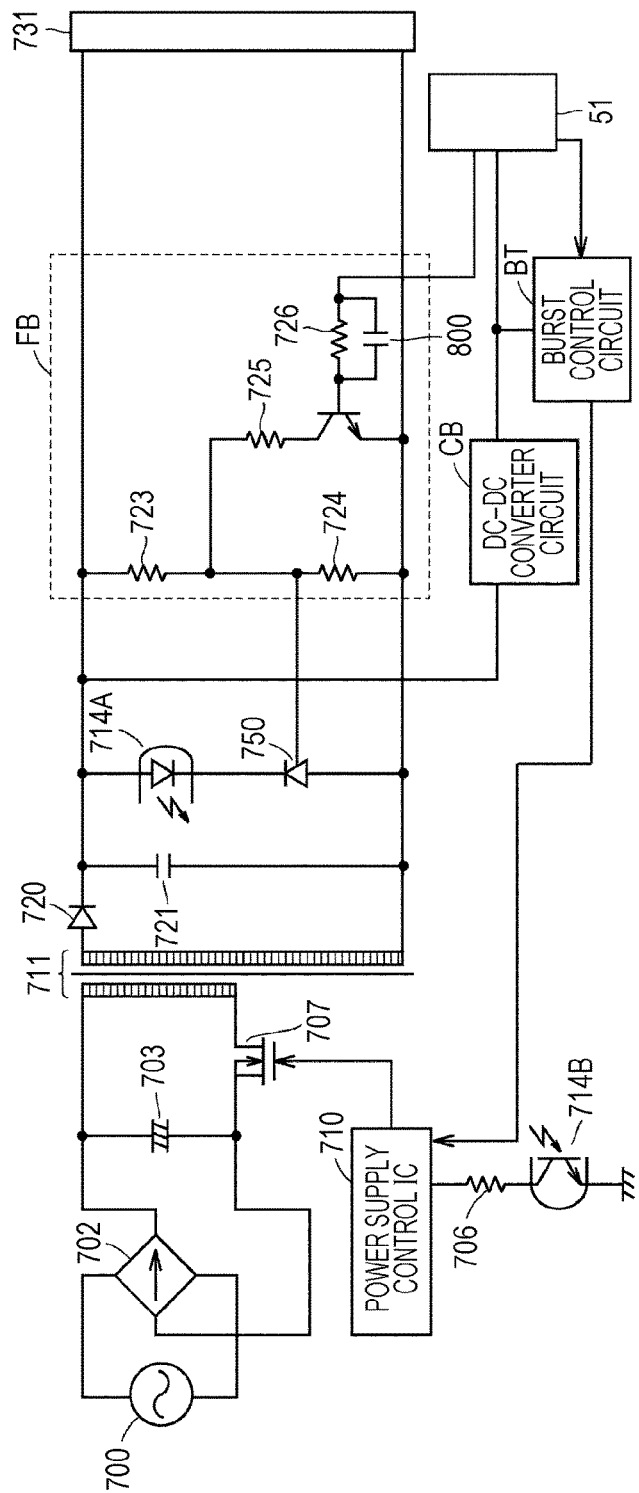
FIG. 11 is a diagram illustrating a configuration of a power supply device according to a modified example of the embodiment.

FIG. 11 is a diagram showing a configuration of a power supply device 50A according to a modified example of the embodiment.

The power supply device 50A shown in FIG. 11 is different from the power supply device 50 described in FIG. 5 in that a burst control circuit BT is further provided.

The burst control circuit BT is connected to the output side of the second DC-DC converter circuit CB and controls the switching of the FET 707 of the first DC-DC converter circuit CA in the power saving mode.

Specifically, the burst control circuit BT has an upper threshold higher than 5 V by a predetermined voltage and a lower threshold lower than 5 V by a predetermined voltage as an example.

When the output of the second DC-DC converter circuit CB reaches the upper threshold in the power saving mode, the burst control circuit BT instructs the power control IC 710 to turn off the FET 707. When the output of the second DC-DC converter circuit CB reaches the lower threshold, the burst control circuit BT instructs the power control IC 710 to switch the FET 707. That is, since the switching operation period and the non-switching operation period of the FET 707 are provided, consumption power can be further reduced.

Figure 12:
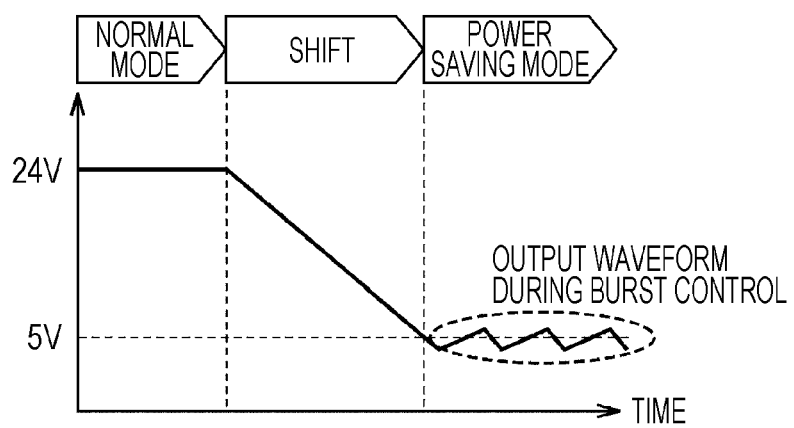
FIG. 12 is a diagram illustrating a shift from a normal mode to a power saving mode of a power supply device according to the modified example of the embodiment.

FIG. 12 is a diagram illustrating a shift from the normal mode to the power saving mode of the power supply device according to the modified example of the embodiment.

In this example, the main body control device 51 instructs the burst control circuit BT to perform the burst control after the mode is shifted to the power saving mode. Accordingly, since the burst control is executed after the mode is shifted to the power saving mode, it is possible to reduce consumption power while suppressing an output ripple.

In this example, a case where the power supply device is mainly used for the image forming apparatus has been described, but the invention is not particularly limited to the image forming apparatus. For example, the method can be generally used for other purposes.

Although embodiments of the present invention have been described and illustrated in detail, the disclosed embodiments are made for purposes of illustration and example only and not limitation. The scope of the present invention should be interpreted by terms of the appended claims and intended to include all modifications within the same meaning and range as those of equivalents of the appended claims.

What is claimed is:

1. A power supply device comprising:
a power supply circuit that converts an AC voltage into a DC voltage; and
a control circuit that controls the power supply circuit, wherein the power supply circuit includes:
    a rectifying and smoothing circuit that rectifies and smoothes the AC voltage;
    a first voltage converting circuit that converts the voltage rectified and smoothed by the rectifying and smoothing circuit and outputs a first DC voltage;
    a second voltage converting circuit that switches the first DC voltage by a switching circuit to output a second DC voltage lower than the first DC voltage;
    a feedback circuit that detects and feeds back an output voltage of the first voltage converting circuit; and
    a selection circuit that switches a reference voltage of the feedback circuit to decrease the first DC voltage of the first voltage converting circuit to a third DC voltage, wherein the selection circuit includes:
        a first current path;
        a second current path; and
        a switch that switches a current path from the first current path to the second current path in response to a switching signal;
        a resistance element that receives an input of the switching signal and is connected to a gate of the switch; and
        a capacitor that is connected in parallel to the resistance element and wherein
the control circuit sets the switching circuit to be in a continuous connection state when a normal mode is shifted to a power saving mode and gradually switches the reference voltage of the feedback circuit when the normal mode is shifted to the power saving mode in accordance with a time constant based on a capacitance of the capacitor.

2. The power supply device according to claim 1, wherein:
the first current path generates a first reference voltage;
the second current path generates a second reference voltage; and
the control circuit delays a change in signal of the switching signal.

3. The power supply device according to claim 1, wherein:
the first current path is connected to an output of the first voltage converting circuit and generates a first reference voltage;
the second current path is connected to an output of the second voltage converting circuit and generates a second reference voltage;
the switch includes:
    a first switching switch that is provided in the first current path; and
    a second switching switch that is provided in the second current path,
the control circuit gradually turns off the first switching switch and gradually turns on the second switching switch when the normal mode is shifted to the power saving mode.

4. The power supply device according to claim 3, wherein the selection circuit further includes:
a first resistance element that receives an input of a first switching signal and is connected to a gate of the first switching switch;
a first capacitor that is connected in parallel to the first resistance element;

a second resistance element that receives an input of a second switching signal and is connected to a gate of the second switching switch; and a second capacitor that is connected in parallel to the second resistance element.

5. The power supply device according to claim 1, further comprising:

a burst control circuit that performs burst control so that an output voltage of the second voltage converting circuit becomes the third DC voltage after the mode is shifted to the power saving mode.

6. The power supply device according to claim 1, wherein the control circuit changes from the normal mode to the power saving mode in accordance with a command.

7. An image forming apparatus comprising:

the power supply device according to claim 1; and an image forming part that is driven by the power supply device.

* * * * *